United States Patent
Li et al.

(10) Patent No.: US 11,528,732 B2
(45) Date of Patent: Dec. 13, 2022

(54) METHOD AND NETWORK NODE FOR HANDLING TRANSMISSION OF LTE OR NR SIGNALS AND NB-IOT SIGNALS TO WIRELESS COMMUNICATION DEVICES

(71) Applicant: TELEFONAKTIEBOLAGET LM ERICSSON (PUBL), Stockholm (SE)

(72) Inventors: Zhongwen Li, Upplands Väsby (SE); Youping Su, Täby (SE); Yuanjun Xu, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 146 days.

(21) Appl. No.: 17/048,295

(22) PCT Filed: May 15, 2018

(86) PCT No.: PCT/SE2018/050502
§ 371 (c)(1),
(2) Date: Oct. 16, 2020

(87) PCT Pub. No.: WO2019/221648
PCT Pub. Date: Nov. 21, 2019

(65) Prior Publication Data
US 2021/0105807 A1    Apr. 8, 2021

(51) Int. Cl.
*H04W 72/12* (2009.01)
(52) U.S. Cl.
CPC .............................. *H04W 72/1278* (2013.01)
(58) Field of Classification Search
CPC ........... H04W 72/082; H04W 72/1278; H04W 72/048; H04L 5/1469; H04L 5/14
See application file for complete search history.

(56) References Cited

U.S. PATENT DOCUMENTS

2013/0003604 A1* 1/2013 Blankenship ......... H04L 5/0053
370/255
2016/0066356 A1    3/2016 Lindoff et al.
(Continued)

OTHER PUBLICATIONS

International Search Report/Written Opinion dated Feb. 25, 2019 in related/corresponding PCT Application No. PCT/SE2018/050502.
(Continued)

*Primary Examiner* — Anez C Ebrahim
(74) *Attorney, Agent, or Firm* — Patent Portfolio Builders PLLC

(57) ABSTRACT

Disclosed is a method performed by a radio access network node of a wireless communication network for handling transmission of LTE or NR signals as well as NB-IoT signals to wireless communication devices over a carrier comprising a plurality of PRBs. The method comprises scheduling the carrier so that at least one of the PRBs is to be used for transmission of NB-IoT signals, called NB-IoT PRBs, and some of the PRBs are to be used for transmission of LTE or NR signals, called LTE PRBs. The method then comprises transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

16 Claims, 9 Drawing Sheets

(56) References Cited

U.S. PATENT DOCUMENTS

2017/0353946 A1* 12/2017 Rico Alvarino .. H04W 72/0453
2018/0020432 A1    1/2018 Alvarino et al.
2018/0063841 A1    3/2018 Song et al.

OTHER PUBLICATIONS

3GPP TS 36.104 version 14.3.0 Release 14, ETSI, "LTE; Evolved Universal Terrestrial Radio Access (E-UTRA); Base Station (BS) radio transmission and reception," Apr. 2017, pp. 1-220.
3GPP TS 38.104 version 15.5.0 Release 15, ETSI, "5G; NR; Base Station (BS) radio transmission and reception," May 2019, pp. 1-219.

* cited by examiner

METHOD AND NETWORK NODE FOR HANDLING TRANSMISSION OF LTE OR NR SIGNALS AND NB-IOT SIGNALS TO WIRELESS COMMUNICATION DEVICES

TECHNICAL FIELD

The present disclosure relates generally to methods and network nodes for handling transmission of LTE or NR signals as well as NB-IoT signals to wireless communication devices over a carrier comprising a plurality of PRBs. The present disclosure further relates to computer programs and carriers corresponding to the above methods and nodes.

BACKGROUND

Wireless digital communication technology has evolved during decades, from 2nd generation systems like Global System for Mobile communication (GSM) up to $4^{th}$ generation systems like Long-Term Evolution (LTE) and the evolving $5^{th}$ generation New Radio (NR) also called 5G. LTE is a standard determining how high-speed wireless communication is to be performed for wireless communication devices. Compared to the older technologies like GSM, LTE increases wireless communication capacity and speed using improved radio interface and improved core network. The LTE standard is developed by the 3rd Generation Partnership Project (3GPP) and is specified in its Release 8 document series, with minor enhancements described in Release 9. NR is primarily directed to communication in millimeter wave bands, i.e. primarily in higher frequencies than communicated in LTE. The purpose of NR is to provide enhanced communication capabilities to wireless communication devices. The NR standard is specified in e.g. 3GPP Release 15.

In society, it is foreseen a strong increase in physical, non-human carried devices having wireless communication capabilities, the so called Internet of Things (IoT). Such IoT devices may be software, sensors, actuators, devices in vehicles, home appliances and other similar items embedded with communication electronics. Both LTE and NR are supposed to cater for providing wireless communication to such IoT devices. A Low Power Wide Area Network (LP-WAN) radio technology standard called Narrow Band IoT (NB-IoT) has been developed to enable IoT devices and similar devices and services to be connected using cellular telecommunications bands. NB-IoT is a narrowband radio technology. It is one of a range of Mobile IoT (MIoT) technologies standardized by 3GPP, within the LTE and NR standards.

When communicating over the air interface in LTE and NR, Orthogonal Frequency Division Multiplexing (OFDM) technology is used. The OFDM communication resource units allocated to wireless communication devices, also called User Equipment (UE), are called Physical Resource Blocks, PRBs. A PRB is a communication unit in frequency and time. A PRB comprises 12 subcarriers. In LTE and NR, the PRB is the smallest unit that can be allocated to a UE. However, in NB-IoT, the UE, i.e. an NB-IoT device, is allocated only one subcarrier. This means that up to 12 NB-IoT devices can have wireless connection through one PRB. An NB-IoT system can comprise one or more PRBs. In LTE, each subcarrier has a bandwidth of 15 kHz or 3.75 kHz. NB-IoT used modulation is Binary Phase Shift Keying (BPSK) and Quadrature Phase Shift Keying (QPSK).

In LTE, the NB-IoT system can be deployed in three different ways. The first alternative is to have a stand-alone system. In this alternative, the NB-IoT system is handled as a separate carrier, i.e. separate from the LTE carriers. Today, each such system comprises one PRB, however in the future the NB-IoT system is supposed to be able to comprise more than one PRB. The bandwidth of one PRB is 180 kHz (when using subcarrier bandwidth of 15 kHz), which is almost the same as a GSM carrier using a channel raster, which is 200 kHz. The basic idea here is that one GSM carrier can be replaced by one NB-IoT PRB.

In the second and third alternative, the NB-IoT system is placed in an LTE carrier. In the second alternative, which is shown in FIG. 1, a PRB in a regular LTE carrier is replaced by a NB-IoT PRB, i.e. the NB-IoT PRB is deployed in-band. In the example of FIG. 1, the $6^{th}$ lowest-frequency PRB of the LTE carrier is replaced by a NB-IoT PRB, or in other words, the PRB is used for NB-IoT transmission instead for being used for LTE transmission. Of course other PRBs can be replaced, as well as more than one PRB. According to recent 3GPP specification, only those PRBs that meet a 100 kHz frequency raster can be used as NB-IoT PRB. In the third alternative, which is shown in FIG. 2, an NB-IoT PRB is deployed in the guard band of the LTE carrier. As shown in both FIG. 1 and FIG. 2, an LTE carrier comprises a plurality of PRBs that cover an LTE transmission bandwidth. The whole LTE channel bandwidth comprises the LTE transmission bandwidth plus guard bands at each side of the LTE transmission bandwidth. In the example of FIG. 2, the NB-IoT PRB is positioned in the upper guard band but it can of course as well be positioned in the lower guard band.

NB-IoT downlink channels are based on existing LTE numerology with single/multi PRB(s) allocation. For the guard-band and inband deployment, NB-IoT follows the same frequency allocation and spacing as LTE. With this allocation, NB-IoT and LTE traffic still use OFDM modulation. Ideally, the interference impact between the two systems in downlink is therefore insignificant in case the downlink signal is not compressed or distorted.

However, in order to improve coverage for NB-IoT in-band or guard band configuration, the NB-IoT PRB(s) power is to be boosted. According to LTE-standard 3GPP 36.104, NB-IoT power dynamic range shall be larger than or equal to +6 dB, except for guard band operation with Evolved Universal Mobile Telecommunications System (UMTS) Terrestrial Radio Access (E-UTRA) 5 MHz channel bandwidth signal where base station manufacturer shall declare the NB-IoT dynamic range power it could support, which means the boost power range can be larger than 6 dB. That the power of the NB-IoT signal sent in the NB-IoT PRB is higher than in the surrounding LTE PRBs can be seen in FIGS. 1 and 2.

There is also a further need for range improvement for applications involving e.g. smart sensors installed under extreme adverse reception conditions such as in a basement, or for widely dispersed devices such as in agricultural applications. So, there is a motivation to boost NB-IoT PRB power even more.

NB-IoT in-band and guard-band operation is not limited to 1 PRB. It may for example be possible to have 2 NB-IoT PRBs in a 5 MHz LTE carrier and 4 NB-IoT PRBs in a 10 MHz LTE carrier. If each NB-IoT PRB power is boosted by 6 dB or even more, the Peak to Average Ratio (PAR) needs to be reduced in order to increase power efficiency of the power amplifier.

Normally, in digital domain, power clipping technology is used in order to reduce PAR. By clipping a signal, the signal is distorted and the orthogonality of the OFDM signal is distorted. As a result, interference from the clipped part of the NB-IoT signal occurs across the LTE channel bandwidth.

Consequently, in order to improve transmission quality for simultaneous transmission of NB-IoT signals and LTE signals in the same channel bandwidth, the effect of interference from the NB-IoT signals on the LTE signals needs to be handled.

SUMMARY

It is an object of the invention to address at least some of the problems and issues outlined above. It is an object of embodiments of the present invention to improve transmission quality for simultaneous transmission from a radio access network node of NB-IoT signals and LTE or NR signals in the same channel bandwidth. It is another object of embodiments of the present invention to handle interference from NB-IoT signals on LTE or NR signals when transmitting NB-IoT signals and LTE or NR signals in the same channel bandwidth. It is possible to achieve these objects and others by using a method and an apparatus as defined in the attached independent claims.

According to one aspect, a method is provided, performed by a radio access network node of a wireless communication network, for handling transmission of LTE or NR signals as well as NB-IoT signals to wireless communication devices over a carrier comprising a plurality PRBs. The method comprises scheduling the carrier so that at least one of the PRBs is to be used for transmission of NB-IoT signals, called NB-IoT PRBs, and some of the PRBs are to be used for transmission of LTE or NR signals, called LTE PRBs. The method further comprises transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

According to another aspect, a radio access network node is provided, operable in a wireless communication network for handling transmission of LTE or NR signals as well as NB-IoT signals to wireless communication devices over a carrier comprising a plurality of PRBs. The radio access network node comprises a processing circuitry and a memory. The memory contains instructions executable by said processing circuitry, whereby the radio access network node is operative for scheduling the carrier so that at least one of the PRBs is to be used for transmission of NB-IoT signals, called NB-IoT PRBs, and some of the PRBs are to be used for transmission of LTE or NR signals, called LTE PRBs. The radio access network node is further operative for transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or for transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
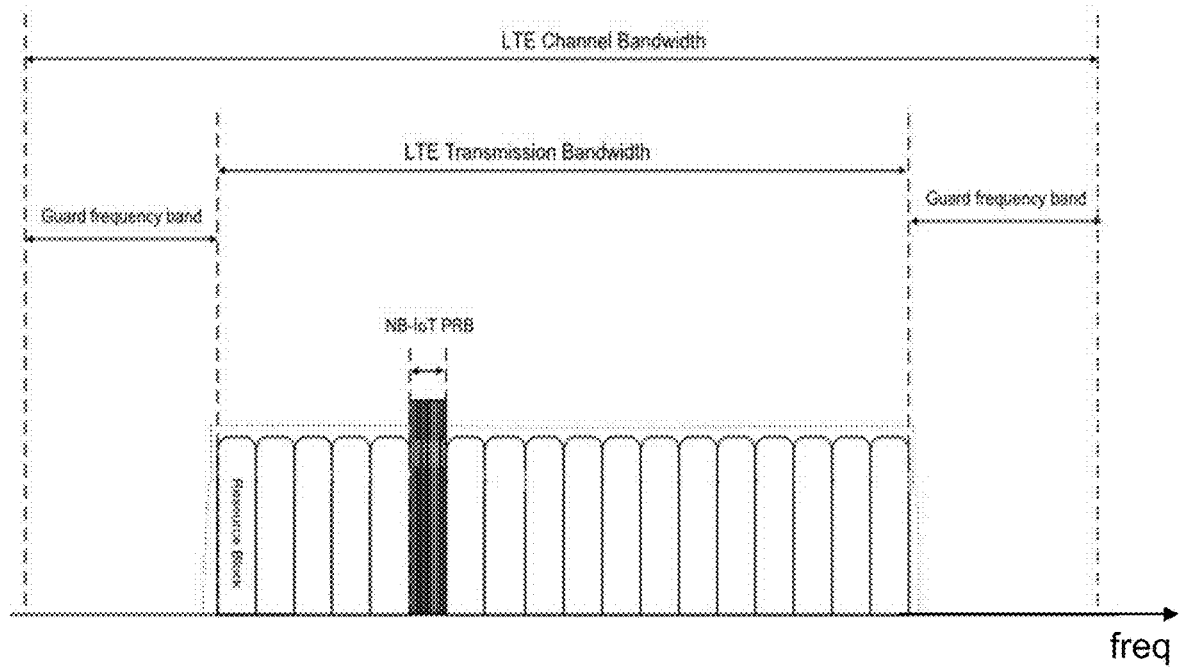
FIG. 1 is a diagram of an LTE channel over frequency in which an NB-IoT PRB is deployed in-band.
Figure 2:
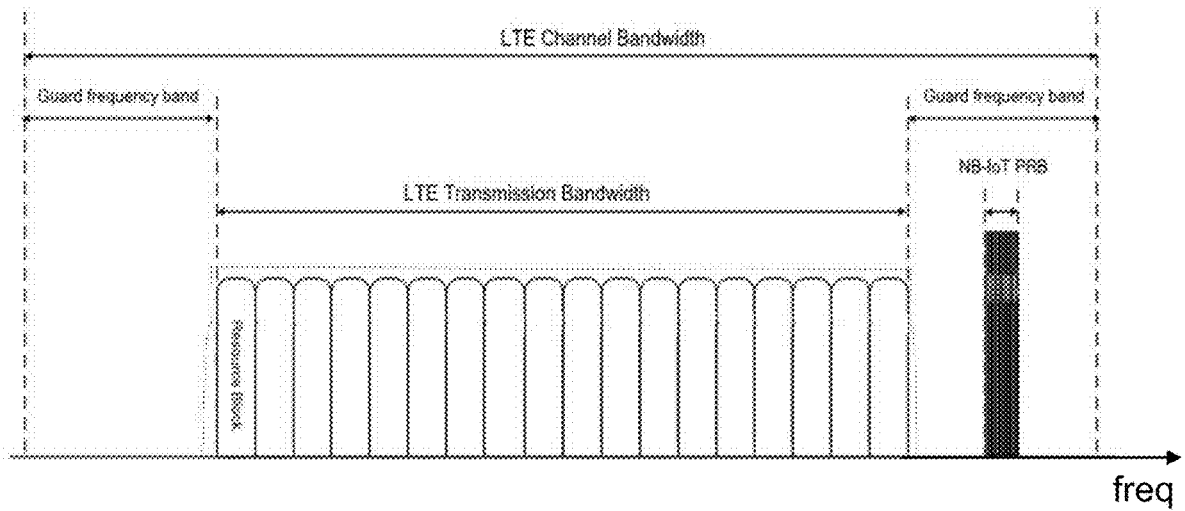
FIG. 2 is diagram of an LTE channel over frequency in which an NB-IoT PRB is deployed the one of the guard bands of the LTE channel.

As mentioned in the background, the NB-IoT signals are boosted with at least 6 dB so that originally comparatively weak signals will reach also for example IoT devices far away. When boosting the signals, the peaks of the signals are clipped in order to keep the signal within the amplitude operation range of the power amplifier. The typical digital power clipping includes detecting power peaks, and lowering the amplitude of the peaks by clipping. By clipping the power peaks, a lot of spur is spread over both in-band and out of band frequencies. To reduce the digital domain out-band spur after clipping, digital filter technology is applied that attenuates the out-band spur and helps the radio unit meet its operating band unwanted emission specification. Normally, this digital filter has the same bandwidth as the LTE carrier bandwidth. In other words, the filter filters out signals outside the LTE carrier bandwidth. If the NB-IoT traffic uses a PRB within the LTE bandwidth, like in FIG. 1 or 2, the clipping filter bandwidth is equal to the whole LTE bandwidth, e.g. 5 MHz or 10 MHz depending on LTE carrier configuration. The clipping was done in time domain. The NB-IoT signals are transmitted together with other normal LTE PRB IQ sample traffic. When clipping is applied, all IQ sample data above the clipping threshold will be clipped as well as the NB-IoT traffic above the clipping threshold. Since the radio unit cannot distinguish the NB-IoT data and the LTE IQ data in time domain, the clipping filter bandwidth is much higher than the NB-IoT signal bandwidth. As the NB-IoT PRBs power is boosted, the probability of NB-IoT data being clipped is higher than the probability of LTE IQ data being clipped. The clipping spur will be spread as in-band noise across the whole LTE carrier band.

The inventors have discovered that especially the PRB(s) that are close in frequency to the NB-IoT PRB(s) are exposed to higher interference power. This means that the Signal to Interference and Noise Ratio (SINR) of those PRBs close to the NB-IoT PRBs have worse SINR compared with other PRBs. The inventors have further discovered that some other PRBs may as well be exposed to higher interference power, such as PRBs in higher order harmonics of the NB-IoT frequency.

Figure 3:
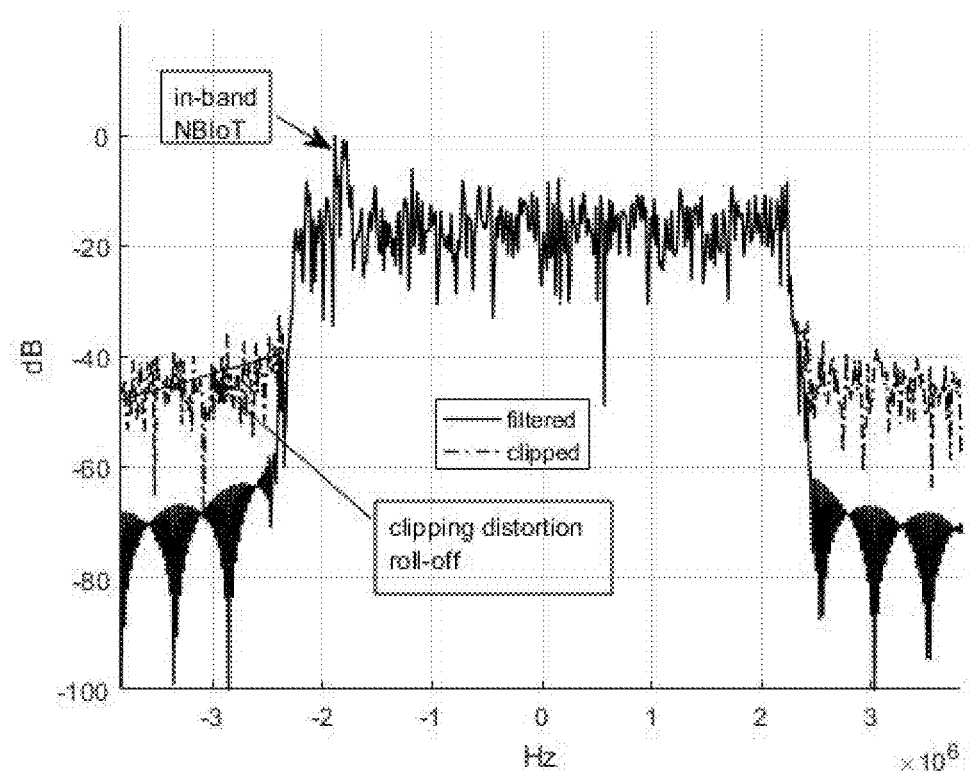
FIG. 3 is an xy-diagram showing the spectrum regrowth for a 9 dB boosted in-band NB-IoT PRB within a 5 MHz LTE channel, wherein the PAR is clipped 3 dB.

As shown in FIG. 3, the clipping of the NB-IoT signal and the LTE signal will generate significant spectrum regrowth. The leakage of clipping-generated energy will be spread into the PRBs close to the NB-IoT PRBs as well as in other PRBs, which in turn will degrade the Signal to Noise and Interference (SINR) in these victim PRBs. The degradation of the system SINR becomes even worse when more boost of NB-IoT is demanded for coverage boosting cases.

As mentioned, the energy leakage outside the LTE carrier bandwidth will be suppressed by clipping filter, i.e. bandpass filter, or other kind of filter in the current deployed LTE system. To use a sharper narrow band filter to counter the adverse effects from clipping will both increase the downlink system delay and demand additional hardware resources that are not generally available in current deployed systems.

Figure 4:
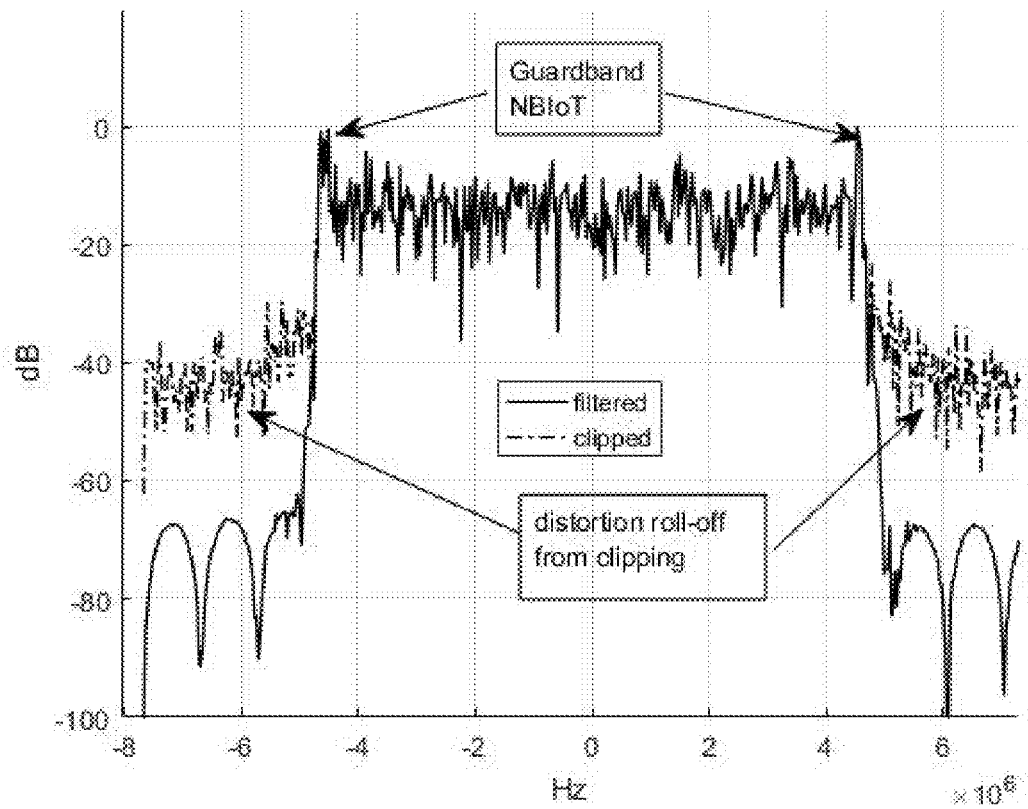
FIG. 4 is an xy-diagram showing the spectrum regrowth for a 9 dB boosted in which a NB-IoT PRB is deployed in each of the guard bands of a 10 MHz LTE channel, wherein the PAR is clipped 3 dB.

Similarly, the boosting of NB-IoT signals when NB-IoT PRB is deployed in the guard band also has victim PRBs. FIG. 4 shows spectrum regrowth from clipping a 10 MHz LTE when 2 NB-IoT PRBs are placed in the LTE guard band. The spectrum regrowth rolls off from around −30 dBc at neighbor PRBs to around −40 dBc for those PRBs located 4-5 PRBs away from the NB-IoT PRBs.

Based on the above knowledge achieved by the inventors, the following embodiments are provided in order to solve the problem of interference resulting from NB-IoT transmission in LTE or NR transmission bandwidths.

Figure 5:
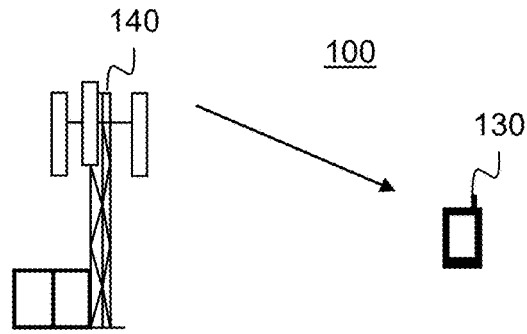
FIG. 5 is a schematic diagram of a communication scenario in which embodiments of the present invention can be used.

FIG. 5 shows a wireless communication network 100 in which the present invention may be used. The wireless communication network 100 comprises a radio access network node 140 that is in, or is adapted for, wireless communication with a wireless communication device 130. The wireless communication network 100 may be any kind of wireless communication network that can provide radio access to wireless communication devices. Example of such wireless communication networks are Long Term Evolution (LTE), LTE Advanced, as well as fifth generation wireless communication networks based on technology such as New Radio (NR).

The radio access network node 140 may be any kind of network node that provides wireless access to a wireless communication device 130 alone or in combination with another network node. Examples of radio access network nodes 140 are a base station (BS), a radio BS, a base transceiver station, a BS controller, a network controller, a Node B (NB), an evolved Node B (eNB), a NR BS, a Multi-cell/multicast Coordination Entity, a relay node, an access point (AP), a radio AP, a remote radio unit (RRU), a remote radio head (RRH) and a multi-standard BS (MSR BS).

The wireless communication device 130 may be any type of device capable of wirelessly communicating with a radio access network node 140 using radio signals, as long as the wireless communication device 130 can communicate using a discontinuous communication method. For example, the wireless communication device 130 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 6:
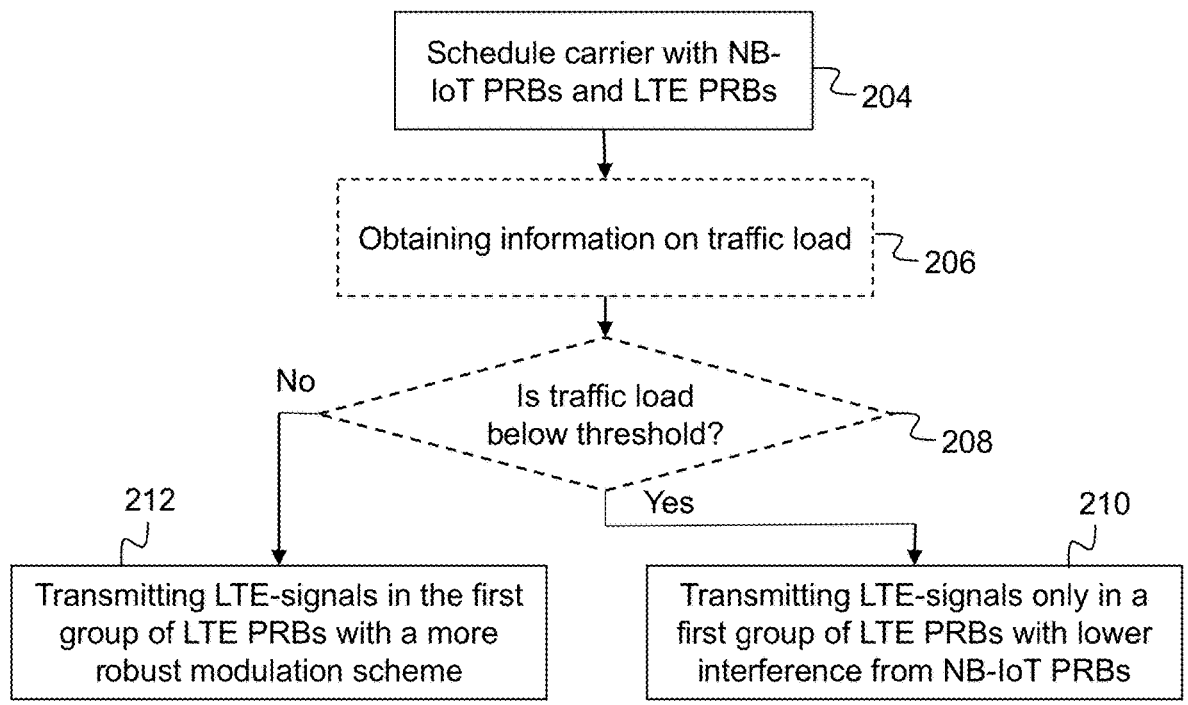
FIG. 6 is a flow chart illustrating a method performed by a radio access network node according to possible embodiments.

FIG. 6, in conjunction with FIG. 5, illustrates a method according to an embodiment, performed by a radio access network node 140 of a wireless communication network 100 for handling transmission of LTE or NR signals as well as NB-IoT signals to wireless communication devices 130 over a carrier comprising a plurality PRBs. The method comprises scheduling 204 the carrier so that at least one of the PRBs is to be used for transmission of NB-IoT signals, called NB-IoT PRBs, and some of the PRBs are to be used for transmission of LTE or NR signals, called LTE PRBs. The method further comprises transmitting 210 LTE or NR signals only in a first group of the scheduled LTE PRBs that experience an interference from the at least one NB-IoT PRB that is lower than the interference experienced from the at least one NB-IoT PRB by a second group of the LTE PRBs, or transmitting 212 LTE or NR signals modulated with a first modulation scheme in the LTE PRBs of the first group, and transmitting LTE or NR signals modulated with a second modulation scheme more robust than the first modulation scheme in the LTE PRBs of the second group.

The carrier may be an LTE or NR carrier. The expression that "an LTE PRB experiences an interference from the at least one NB-IoT PRB" signifies an interference occurring to the LTE signals transmitted on the LTE PRBs due to transmission of NB-IoT signals on the NB-IoT PRB. According to LTE-standard 3GPP 36.104 and NR-standard 3GPP 38.104, IoT-signals are to be sent with a transmission power boosted with at least 6 dB compared to LTE and NR signals. Such boosting, especially when used together with clipping of peaks, will give rise to distortions. The distortions due to the IoT signals sent on NB IoT PRBs have proven to be different for different PRBs, depending on the placement of the NB IoT PRBs in relation to the placement of the individual LTE PRBs. In other words, depending on the placement of the NB IoT PRBS, some of the LTE PRBs will have better Signal to Interference and Noise Ratio (SINR) than other LTE PRBs of the allocated PRB range of the carrier. Based on SINR variation information derived in the NB IoT deployment, the LTE PRBs that have worse SINR may be grouped in a second group of "non-preferred" LTE PRBs and the LTE PRBs that have better SINR may be grouped in a first group of "preferred" LTE PRBs. Distortion peaks may occur in LTE PRBs that are neighboring the NB IoT PRBs but also in other frequency areas, such as in higher order harmonics of the NB IoT frequency. A scheduling scheme can then be designed that uses the available LTE PRBs so that the LTE PRBs of the first group are used first, i.e. preferred. Hereby, communication of LTE or NR signals can be improved. For example, the first modulation scheme may be 256 QAM and the second modulation scheme may be BPSK, QPAK or 8PSK.

According to an embodiment, the LTE PRBs of the first group have at least a defined number of LTE PRBs between the LTE PRB in question and any of the scheduled NB-IoT PRBs. Further, the LTE PRBs of the second group have less than the defined number of LTE PRBs between the LTE PRB in question and any of the scheduled NB-IoT PRBs. The PRBs of the carrier are spread out in frequency over the carrier bandwidth. In other words, the carrier comprises a plurality of PRBs that are consecutive in frequency over the carrier bandwidth. The LTE carrier is scheduled in frequency as well as in time. The LTE carrier is scheduled with at least one NB-IoT PRB as well as with a plurality of LTE PRBs. For frequency scheduling, at least one of the plurality of frequency consecutive PRBs will be deployed as a NB-IoT PRB and the rest of the PRBs will be deployed as LTE PRBs. LTE signals are to be transmitted over the LTE PRBs and NB-IoT signals are to be transmitted over the NB-IoT PRBs. The distortions originating from transmission of IoT signals have proven to be strongest in the frequency bands neighboring the power boosted IoT PRB. By transmitting LTE or NR signals in the LTE PRBs closest to the IoT PRBs modulated with a more robust modulation scheme than used for LTE PRBs further away from the IoT PRBs, or by not transmitting any LTE or NR signals in the LTE PRBs closest to the IoT PRBs, the distortions can be handled without extra hardware costs in the transmitter for suppressing such distortions. Also, existing crest factor reduction (CFR) algorithms can be used.

According to an embodiment, the method further comprises obtaining 206 information on traffic load of signals transmitted from the radio access network node 140 towards the wireless communication devices 130 and determining 208 whether the traffic load is below a threshold or not. Further, when it is determined 208 that the traffic load is below the threshold, then only the LTE or NR signals are transmitted 210 in the LTE PRBs of the first group. "Traffic load" signifies amount of data or signals sent per time unit from the radio access network node towards the wireless communication devices. By only transmitting LTE or NR signals in the LTE PRBs of the first group when the downlink traffic load is below a threshold, the LTE PRBs that experience the highest distortion interference are avoided to be used when the total traffic load of the radio access network node indicates that they are not needed for capacity reasons. Hereby, a high throughput performance can be achieved for the sent signals.

Further, when it is determined 208 that the traffic load is below the threshold, it is determined not to transmit any LTE or NR signals in the LTE PRBs of the second group. In other words, a decision is made to not transmit any LTE or NR signals in the LTE PRBs of the second group but only in the LTE PRBs of the first group.

According to another embodiment, when it is determined 208 that the traffic load is not below the threshold, the LTE or NR signals are transmitted 212 modulated with the first modulation scheme in the LTE PRBs of the first group, and the LTE or NR signals are transmitted modulated with the second modulation scheme in the LTE PRBs of the second group.

According to another embodiment, the carrier comprises a data transmission bandwidth and at least one guard frequency band and the at least one NB-IoT PRB is scheduled 204 in any of the at least one guard frequency band.

According to another alternative, the carrier comprises a data transmission bandwidth and at least one guard frequency band and the at least one NB-IoT PRB is scheduled 204 in the data transmission bandwidth.

Figure 7:
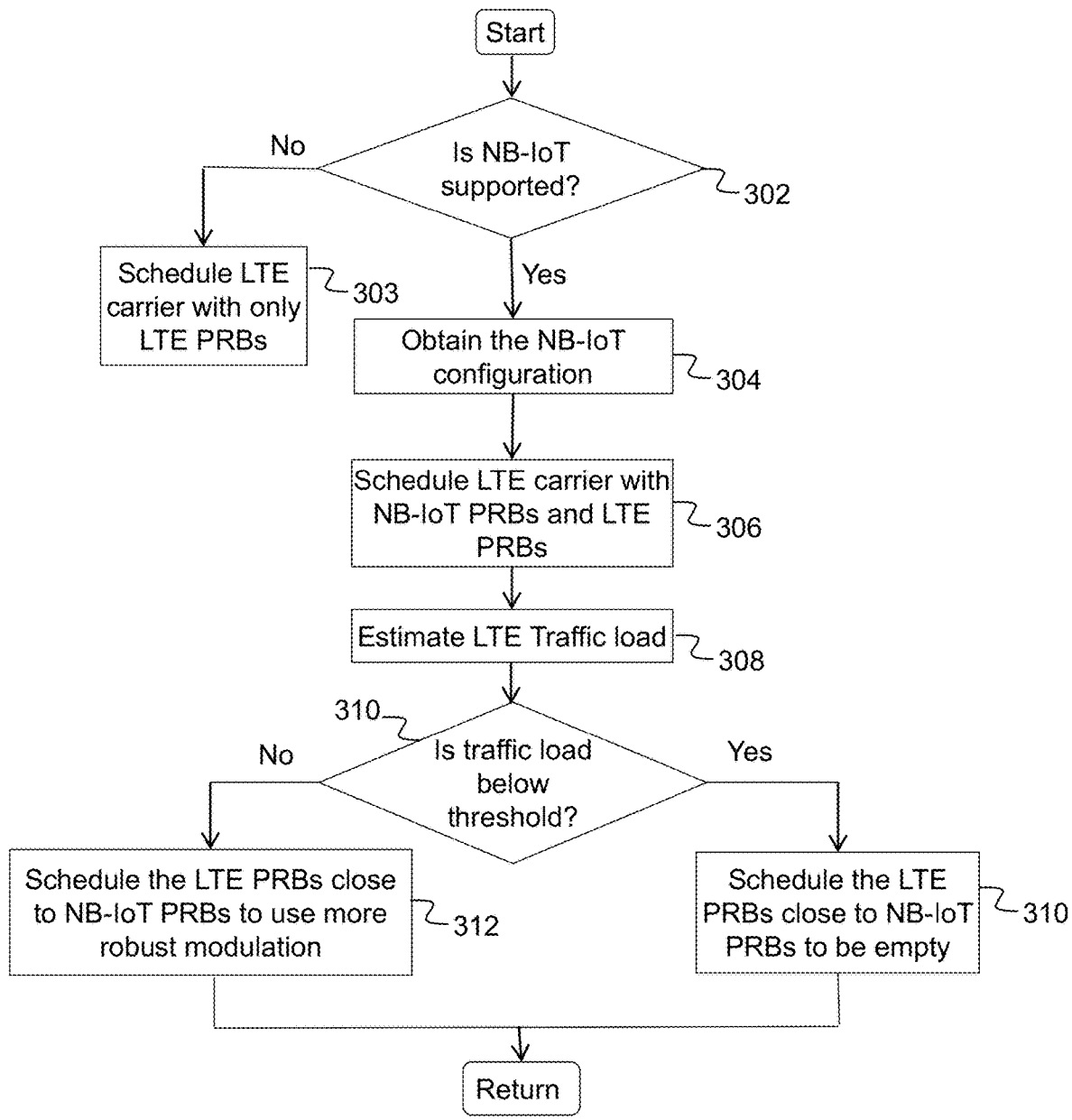
FIG. 7 is a flow chart illustrating a method performed by a radio access network node according to other possible embodiments.

FIG. 7 shows an embodiment of a method for baseband PRB scheduling control. The method of the embodiment starts with determining 302 whether an NB-IoT service is supported. In other words, it is determined whether any wireless communication device 130 connected to the radio access network node 140 is a device that is to communicate using NB-IoT. When the radio access network node is determined not to support NB-IoT service, the LTE carrier is scheduled 303 with only LTE PRBs. When, on the other hand, the NB-IoT service is supported, an NB-IoT configuration is obtained 304 based on traffic scheduling information received in the baseband. Then a number of NB-IoT PRBs are mapped into the LTE carrier. In other words, the LTE carrier is scheduled 306 with NB-IoT PRBs and LTE PRBs according to the configuration. Further, the current downlink traffic load of the radio access network node 140 is estimated 308. When the traffic load is below a certain threshold, the LTE PRBS that are situated close to any of the NB-IoT PRBs, i.e. within a certain number of LTE PRBs from any NB-IoT PRB, are scheduled 310 to be empty, i.e. no downlink LTE signals are sent in those LTE PRBs. In other words, only the LTE PRBs that are determined not to be close to any of the NB-IoT PRBS are used for transmission of downlink LTE signals. When the traffic load is above or equal to the certain threshold, the LTE PRBS that are determined to be situated close to any of the NB-IoT PRBs are scheduled 312 to use a more robust modulation scheme than used for the LTE PRBs that are determined not to be situated close to any of the NB-IoT PRBs.

Figure 8:
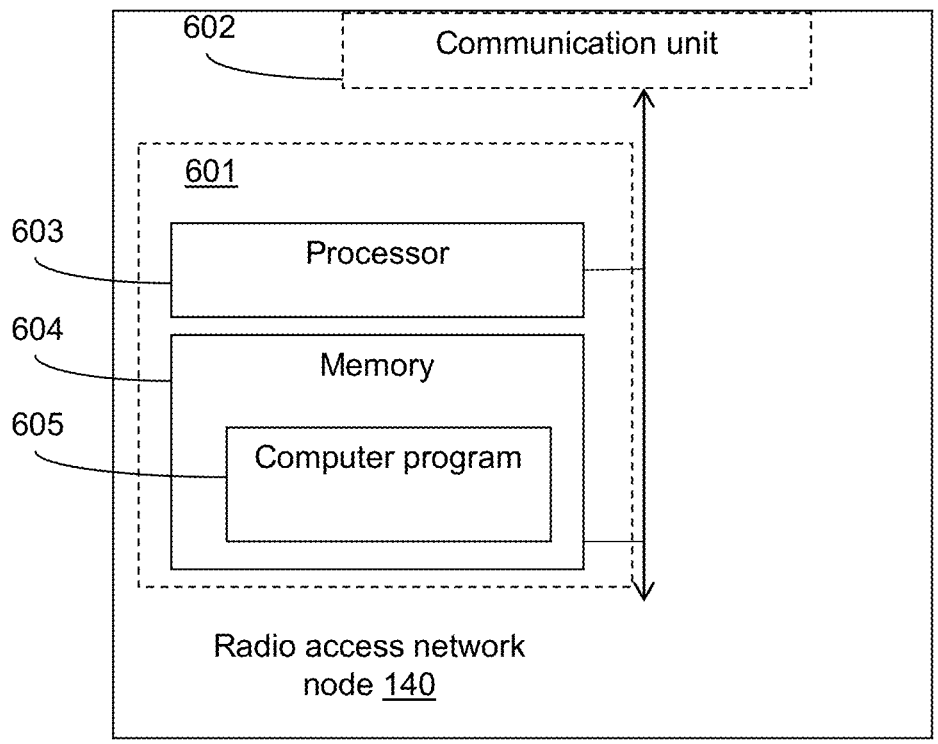
FIGS. 8-9 are block diagrams illustrating a radio access network node in more detail, according to further possible embodiments.

FIG. 8, in conjunction with FIG. 5, describes a radio access network node 140 operable in a wireless communication network 100 for handling transmission of LTE or NR signals as well as NB-IoT signals to wireless communication devices 130 over a carrier comprising a plurality of PRBs. The radio access network node 140 comprises a processing circuitry 603 and a memory 604. The memory contains instructions executable by said processing circuitry, whereby the radio access network node 140 is operative for scheduling the carrier so that at least one of the PRBs is to be used for transmission of NB-IoT signals, called NB-IoT PRBs, and some of the PRBs are to be used for transmission of LTE or NR signals, called LTE PRBs. The radio access network node 140 is further operative for transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or for transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

According to an embodiment, the LTE PRBs of the first group have at least a defined number of LTE PRBs between the LTE PRB in question and any of the scheduled NB-IoT PRBs, and wherein the LTE PRBs of the second group have less than the defined number of LTE PRBs between the LTE PRB in question and any of the scheduled NB-IoT PRBs.

According to another embodiment, the radio access network node 140 is further operative for obtaining information on traffic load of signals transmitted from the radio access network node towards the wireless communication devices, determining whether the traffic load is below a threshold or not, and when it is determined that the traffic load is below the threshold, only transmitting the LTE or NR signals in the LTE PRBs of the first group.

According to another embodiment, the radio access network node 140 is further operative for determining not to transmit any LTE or NR signals in the LTE PRBs of the second group when it is determined that the traffic load is below the threshold.

According to another embodiment, the radio access network node 140 is further operative for, when it is determined that the traffic load is not below the threshold, transmitting the LTE or NR signals modulated with the first modulation scheme in the LTE PRBs of the first group and transmitting the LTE or NR signals modulated with the second modulation scheme in the LTE PRBs of the second group.

According to another embodiment, the carrier comprises a data transmission bandwidth and at least one guard frequency band and the radio access network node is operative for scheduling the at least one NB-IoT PRB in any of the at least one guard frequency band.

According to another embodiment, the carrier comprises a data transmission bandwidth and at least one guard frequency band and the radio access network node is operative for scheduling the at least one NB-IoT PRB in the data transmission bandwidth.

According to other embodiments, the radio access network node 140 may further comprise a communication unit 602, which may be considered to comprise conventional means for wireless communication with the wireless communication devices 130, such as a transceiver for wireless transmission and reception nodes in the communication network. The communication unit 602 may also comprise conventional means for communication with other radio access network nodes of the wireless communication network 100. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the radio access network node 140 to perform the steps described in any of the described embodiments of the radio access network node 140 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the radio access network node 140 has access via the communication unit 602. The computer program 605 may then be downloaded from the server into the memory 604.

Figure 9:
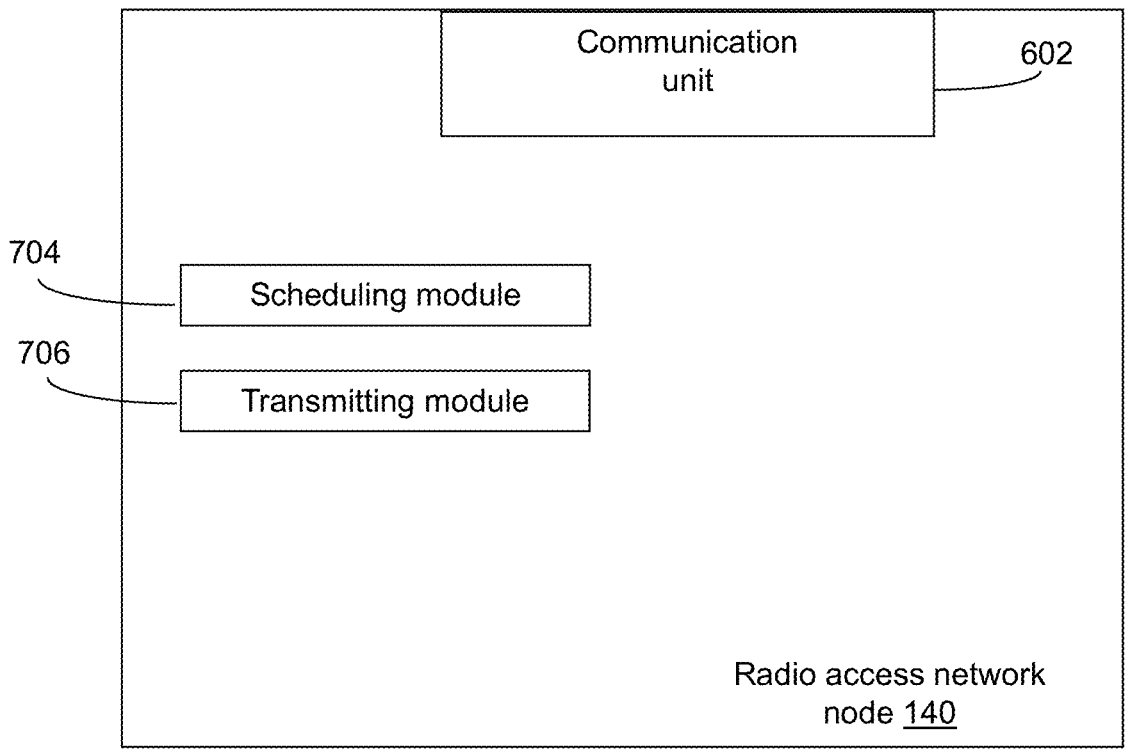

FIG. 9, in conjunction with FIG. 5, describes a radio access network node 140 operable in a wireless communication network 100 for handling transmission of LTE or NR signals as well as NB-IoT signals to wireless communication devices 130 over a carrier comprising a plurality of PRBs. The radio access network node 140 comprises a scheduling module 704 for scheduling the carrier so that at least one of the PRBs is to be used for transmission of NB-IoT signals, called NB-IoT PRBs, and some of the PRBs are to be used for transmission of LTE or NR signals, called LTE PRBs, and a transmitting module 706 for transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or for transmitting LTE or NR signals modulated with a first modulation scheme in the LTE PRBs of the first group, and transmitting LTE or NR signals modulated with a second modulation scheme more robust than the first modulation scheme in the LTE PRBs of the second group. The radio access network node 140 may further comprise a communication unit 602 similar to the communication unit described in FIG. 8. In an embodiment, the modules of FIG. 9 are implemented as a computer program running on a processing circuitry, such as the processing circuitry 603 shown in FIG. 8.

Figure 10:
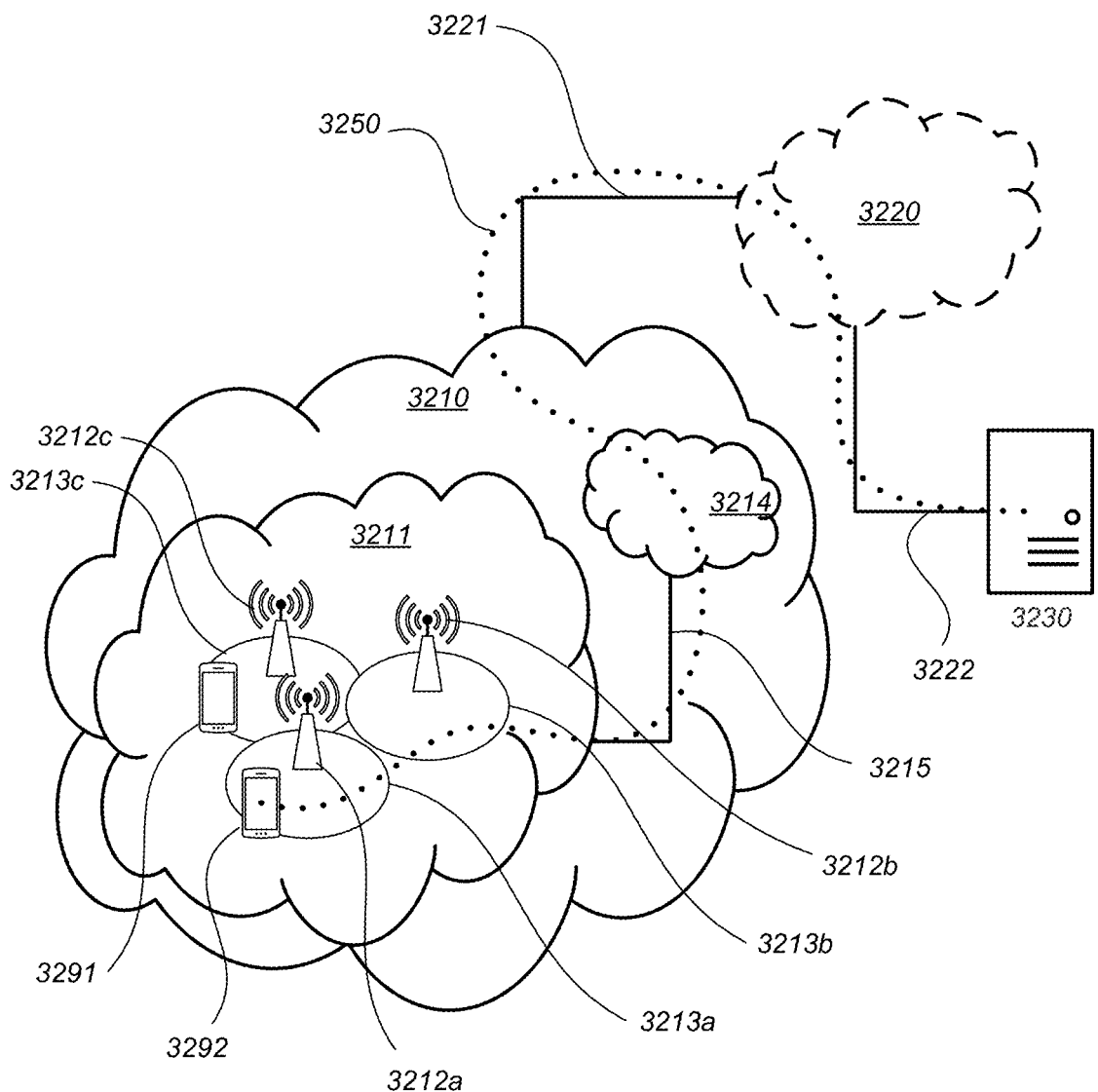
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
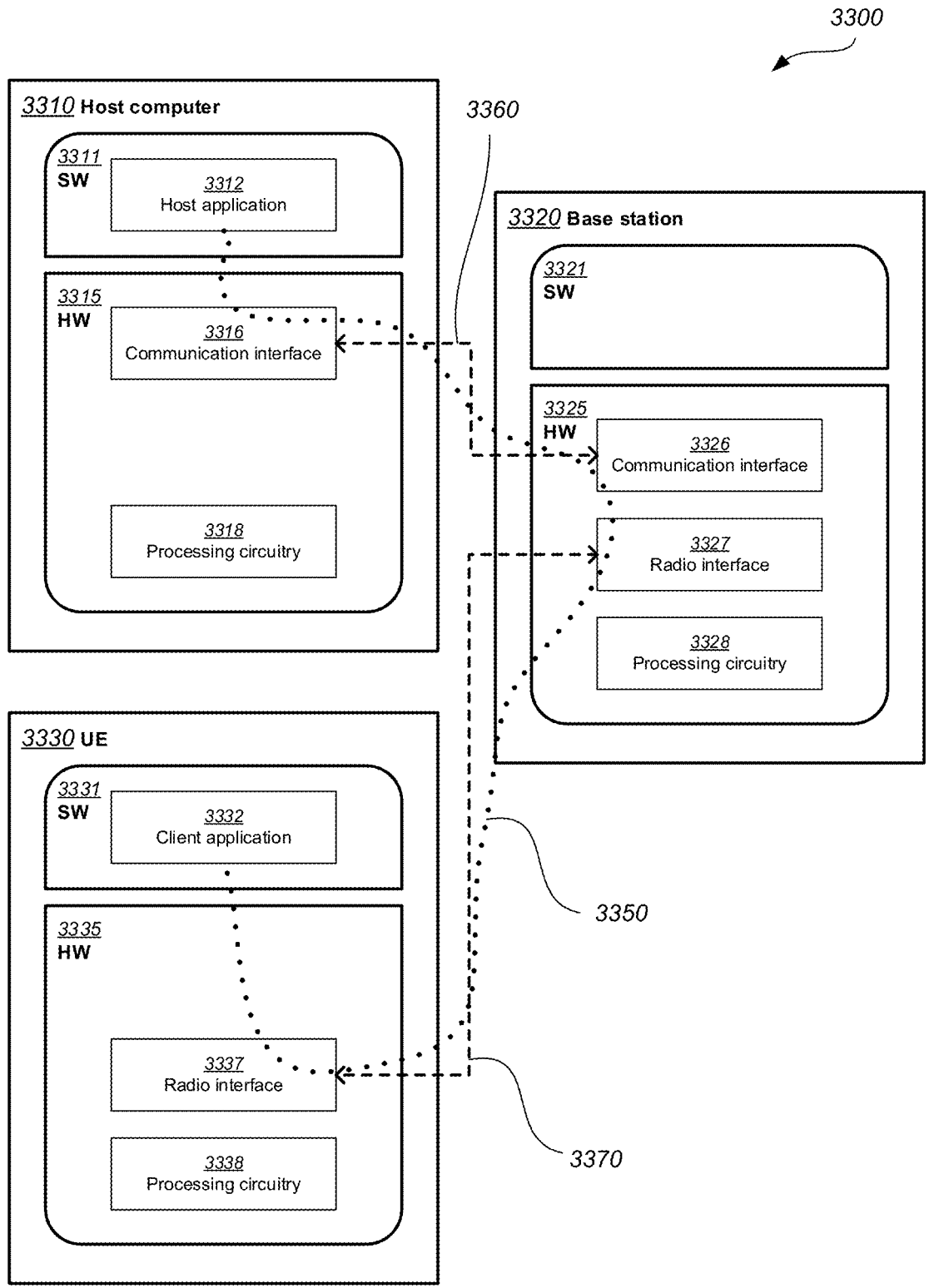
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and the latency for downlink communication to the UE, as interference from transmission of NB-IoT signals in NB-IoT PRBs situated in the same carrier bandwidth as the NB-IoT in which the UE receives LTE or NR signals generally has lower impact on the LTE or NR transmission than in prior art methods. Thereby, reduced user waiting time, relaxed restriction on file size and better responsiveness can be achieved at the UE.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
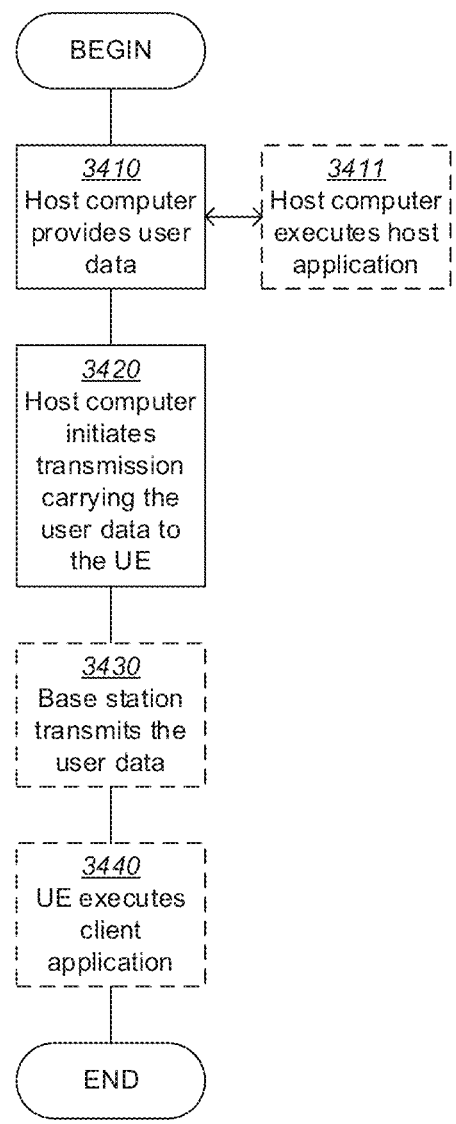
FIGS. 12-13 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 13:
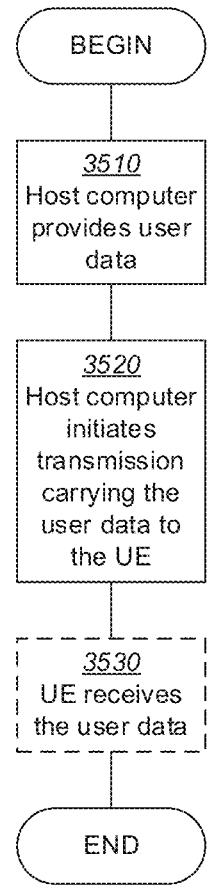

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

In the following numbered embodiments, the wording "base station" is equivalent to the wording "radio access network node" used in other parts of this application text, such as in the claims. Further, the wording "UE" is equivalent to the wording "wireless communication device" used in other parts of this application text, such as in the claims.

Numbered Embodiments

5. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured for:

scheduling the carrier so that at least one of the PRBs is to be used for transmission of NB-IoT signals, called NB-IoT PRBs, and some of the PRBs are to be used for transmission of LTE or NR signals, called LTE PRBs, and transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

6. The communication system of embodiment 5, further including the base station.

7. The communication system of embodiment 6, further including the UE, wherein the UE is configured to communicate with the base station.

8. The communication system of embodiment 7, wherein:

the processing circuitry of the host computer is configured to execute a host application, thereby providing the user data; and the UE comprises processing circuitry configured to execute a client application associated with the host application.

15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station is:

scheduling the carrier so that at least one of the PRBs is to be used for transmission of NB-IoT signals, called NB-IoT PRBs, and some of the PRBs are to be used for transmission of LTE or NR signals, called LTE PRBs, and transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

16. The method of embodiment 15, further comprising:

at the base station, transmitting the user data.

17. The method of embodiment 16, wherein the user data is provided at the host computer by executing a host application, the method further comprising:

at the UE, executing a client application associated with the host application.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a radio access network node of a wireless communication network for simultaneously transmitting Long Term Evolution, LTE, or New Radio, NR, signals and Narrowband Internet of Things, NB-IoT, signals to wireless communication devices over a carrier comprising a plurality of Physical Resource Blocks, PRBs, the method comprising:

scheduling the carrier wherein at least one of the plurality of PRBs is used for transmission of NB-IoT signals, called NB-IoT PRBs, and some of the plurality of PRBs are used for transmission of LTE or NR signals, called LTE PRBs; and transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

2. The method according to claim 1, wherein the LTE PRBs of the first group have at least a defined number of LTE PRBs between a respective LTE PRB of the first group and any of the scheduled NB-IoT PRBs, and wherein the LTE PRBs of the second group have less than the defined number of LTE PRBs between a respective LTE PRB of the second group and any of the scheduled NB-IoT PRBs.

3. The method according to claim 1, further comprising:
obtaining information on a traffic load of signals transmitted from the radio access network node towards the wireless communication devices;
determining whether the traffic load is below a threshold or not; and
when it is determined that the traffic load is below the threshold, only transmitting the LTE or NR signals in the LTE PRBs of the first group.

4. The method according to claim 3, wherein when it is determined that the traffic load is below the threshold, determining not to transmit any LTE or NR signals in the LTE PRBs of the second group.

5. The method according to claim 3, wherein when it is determined that the traffic load is not below the threshold, transmitting the LTE or NR signals modulated with the first modulation scheme in the LTE PRBs of the first group, and transmitting the LTE or NR signals modulated with the second modulation scheme in the LTE PRBs of the second group.

6. The method according to claim 1, wherein the carrier comprises a data transmission bandwidth and at least one guard frequency band and wherein the at least one NB-IoT PRB is scheduled in any of the at least one guard frequency band.

7. The method according to claim 1, wherein the carrier comprises a data transmission bandwidth and at least one guard frequency band and wherein the at least one NB-IoT PRB is scheduled in the data transmission bandwidth.

8. A radio access network node operable in a wireless communication network for simultaneously transmitting LTE or NR signals and NB-IoT signals to wireless communication devices over a carrier comprising a plurality of PRBs, the radio access network node comprising a processing circuitry and a memory, said memory containing instructions executable by said processing circuitry, whereby the radio access network node is configured to:
schedule the carrier wherein at least one of the plurality of PRBs is used for transmission of NB-IoT signals, called NB-IoT PRBs, and some of the plurality of PRBs are used for transmission of LTE or NR signals, called LTE PRBs; and
transmit LTE or NR signals only in a first group of the scheduled LTE PRBs that experience an interference from the at least one NB-IoT PRB that is lower than the interference experienced from the at least one NB-IoT PRB by a second group of the LTE PRBs, or
transmit LTE or NR signals modulated with a first modulation scheme in the LTE PRBs of the first group, and transmitting LTE or NR signals modulated with a second modulation scheme more robust than the first modulation scheme in the LTE PRBs of the second group.

9. The radio access network node according to claim 8, wherein the LTE PRBs of the first group have at least a defined number of LTE PRBs between a respective LTE PRB of the first group and any of the scheduled NB-IoT PRBs, and wherein the LTE PRBs of the second group have less than the defined number of LTE PRBs between a respective LTE PRB of the second group and any of the scheduled NB-IoT PRBs.

10. The radio access network node according to claim 8, further being configured to:
obtain information on a traffic load of signals transmitted from the radio access network node towards the wireless communication devices;
determine whether the traffic load is below a threshold or not; and
when it is determined that the traffic load is below the threshold, only transmitting the LTE or NR signals in the LTE PRBs of the first group.

11. The radio access network node according to claim 10, further being configured to not transmit any LTE or NR signals in the LTE PRBs of the second group when it is determined that the traffic load is below the threshold.

12. The radio access network node according to claim 10, further being configured to transmit the LTE or NR signals modulated with the first modulation scheme in the LTE PRBs of the first group and transmitting the LTE or NR signals modulated with the second modulation scheme in the LTE PRBs of the second group, when it is determined that the traffic load is not below the threshold.

13. The radio access network node according to claim 8, wherein the carrier comprises a data transmission bandwidth and at least one guard frequency band and the radio access network node is configured to schedule the at least one NB-IoT PRB in any of the at least one guard frequency band.

14. The radio access network node according to claim 8, wherein the carrier comprises a data transmission bandwidth and at least one guard frequency band and the radio access network node is configured to schedule the at least one NB-IoT PRB in the data transmission bandwidth.

15. A computer program stored on a non-transitory computer readable medium and comprising instructions, which, when executed by at least one processing circuitry of a radio access network node operable in a wireless communication system for simultaneously transmitting LTE or NR signals and NB-IoT signals to wireless communication devices over a carrier comprising a plurality of PRBs, causes the radio access network node to perform the following steps:
scheduling the carrier wherein at least one of the plurality of PRBs is used for transmission of NB-IoT signals, called NB-IoT PRBs, and some of the plurality of PRBs are used for transmission of LTE or NR signals, called LTE PRBs; and
transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or
transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

16. A radio access network node operable in a wireless communication network for simultaneously transmitting LTE or NR signals and NB-IoT signals to wireless communication devices over a carrier comprising a plurality of PRBs, the radio access network node comprising:
  a scheduling module for scheduling the carrier wherein at least one of the plurality of PRBs is used for transmission of NB-IoT signals, called NB-IoT PRBs, and some of the plurality of PRBs are used for transmission of LTE or NR signals, called LTE PRBs; and
  a transmitting module for transmitting LTE or NR signals only in a first group of the scheduled LTE PRBs that experience an interference from the at least one NB-IoT PRB that is lower than the interference experienced from the at least one NB-IoT PRB by a second group of the LTE PRBs, or for transmitting LTE or NR signals modulated with a first modulation scheme in the LTE PRBs of the first group, and transmitting LTE or NR signals modulated with a second modulation scheme more robust than the first modulation scheme in the LTE PRBs of the second group.

* * * * *